United States Patent [19]
Caudill

[11] 3,804,525
[45] Apr. 16, 1974

[54] LONG RANGE LASER TRAVERSING SYSTEM

[75] Inventor: Louis O. Caudill, Laurel, Md.

[73] Assignee: The United States of America as represented by the Administrator of the National Aeronautics and Space Administration, Washington, D.C.

[22] Filed: July 14, 1971

[21] Appl. No.: 162,380

[52] U.S. Cl................. 356/152, 356/141, 356/172, 250/204, 33/285
[51] Int. Cl. .......................................... G01b 11/26
[58] Field of Search ............... 356/1, 141, 152, 172; 250/204; 33/281, 285; 343/113 R

[56] References Cited
UNITED STATES PATENTS

| | | | |
|---|---|---|---|
| 3,012,469 | 12/1961 | Clayborne | 356/172 |
| 3,545,862 | 12/1970 | Ackerman | 356/5 |
| 3,443,095 | 5/1969 | Frungel | 356/152 |
| 3,137,756 | 6/1964 | Gunther et al. | 356/1 |
| 3,653,049 | 3/1972 | Thayer et al. | 343/113 R |

Primary Examiner—Benjamin A. Borchelt
Assistant Examiner—S. C. Buczinski
Attorney, Agent, or Firm—R. F. Kempf; John R. Manning

[57] ABSTRACT

The relative azimuth bearing between first and second spaced terrestrial points which may be obscured from each other by intervening terrain is measured by placing at one of the points a laser source for projecting a collimated beam upwardly in the vertical plane. The collimated laser beam is detected at the second point by positioning the optical axis of a receiving instrument for the laser beam in such a manner that the beam intercepts the optical axis. In response to the optical axis intercepting the beam, the beam is deflected into two different ray paths by a beam splitter having an apex located on the optical axis. The energy in the ray paths is detected by separate photoresponsive elements that drive logic networks for providing indications of:

a. the optical axis intercepting the beam;
b. the beam being on the left of the optical axis and
c. the beam being on the right side of the optical axis.

8 Claims, 2 Drawing Figures

INVENTOR,
LOUIS CAUDILL
BY Robert F Kumpf
ATTORNEYS

LONG RANGE LASER TRAVERSING SYSTEM

ORIGIN OF THE INVENTION

The invention described herein was made by an employee of the United States Government and may be manufactured and used by or for the Government for governmental purposes without the payment of any royalties thereon or therefor.

FIELD OF INVENTION

The present invention relates generally to a system for and method of determining the relative angular azimuth bearing between two terrestrial points, and, more particularly, to a system and method wherein a collimated energy beam is transmitted from one of the points and is detected at a second one of the points.

BACKGROUND OF THE INVENTION

Generally, the procedure for determining the relative angular azimuth bearing between two points that are not in direct line of sight has involved the establishing of intermediate points where line of sight vision can be maintained. This procedure is time consuming and therefore costly. In addition, if the terrain between the two points is rugged, the amount of physical labor required to establish intermediate sightings is appreciable. Further, the requirement for establishing a number of intermediate measuring points frequently results in erroneous measurements. These errors can accumulate in the same direction to produce inaccuracies of a substantial nature.

To avoid these problems, a system has been proposed wherein radiant energy is transmitted in a generally horizontal direction from a first point towards a second point. At the second point, there is provided a receiving instrument having an upwardly directed axis. In response to the axis of the receiver intercepting the beam of radiant energy an indication of the relative azimuth bearing between the first and second points is derived by monitoring the pointing angle of the radiant energy source.

While the prior art, proposed active system utilizing a radiant energy source theoretically functions in the desired manner, there are certain problems associated therewith, particularly if triangulation between the points is desired. In triangulation, it is necessary to employ three active sources, which are inherently more expensive than detectors.

A further problem in utilizing an active source for deriving radiant energy having an aixs directed generally in the horizontal plane in combination with a detector having an axis lying in the vertical plane is that azimuth bearings are determined by rotating the source relative to the axis of the detector. This requires a relatively complex communication system between the detector and source to enable an operator at the source to be apprised of the relative position between the beam and the detector axis. If several active sources are employed, the communication system becomes more complex because of the need to signal the relative position between each beam and the detector axis to three separate sites.

BRIEF DESCRIPTION OF THE INVENTION

In accordance with the present invention, an upwardly directed, collimated radiation beam, preferably a laser beam, is projected from one of the points in the vertical plane. A receiver for the radiant energy is located at the second point. The receiver has an optical axis which is positioned by an operator to intersect the radiant energy beam when the correct bearing angle azimuth between the two points is achieved. Thereby there is no need for a relatively complex communication system to transmit signals indicative of relative bearing between the two points. Further, if triangulation amongst several points to a common point is desired, a single laser source is located at the common point and a receiver is positioned at each of the other points. Since receivers are much less expensive than active sources, the system is relatively inexpensive, even when used for triangulation.

A feature of the invention concerns the relatively inexpensive nature of each receiver and the indicating apparatus associated with it. Each receiver includes a beam splitter having an apex located on the receiver optical axis. In response to the optical axis intersecting the beam, the beam is split into two ray paths. If the beam is located on one side or the other of the optical axis, there is then established only one ray path. Photodetecting devices responsive to the optical energy in the two ray paths feed logic networks for deriving indications of whether the beam intersects the optical axis or is on one side or the other of the optical axis.

It is, accordingly, an object of the present invention to provide a new and improved system for and method of determining the bearing angle between two spaced points, without requiring intermediate measurements even though there is no direct line of sight between the two points.

Another object of the present invention is to provide a system for and method of determining the relative azimuth bearing angle between two spaced points wherein an active radiant energy source is located at one of the points and a receiver that is easily adjusted with regard to angular position is located at the other of the points.

A further object of the invention is to provide a system for determining the bearing between two spaced points wherein radiant energy is projected from one of the points along a first optical axis and a receiver at the second point has an optical axis adapted to intersect with the first optical axis, wherein the receiver includes means for providing indications of the axes intersecting or on which side the detector axis is relative to the source axis.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figure 1:
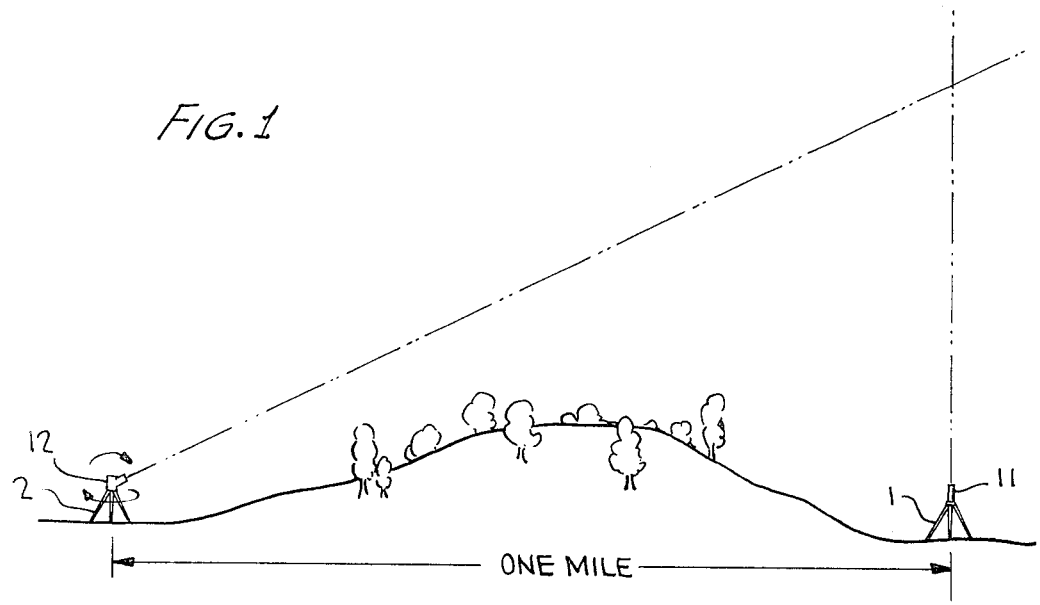
FIG. 1 is a schematic diagram of one embodiment of the azimuth bearing determining system of the present invention.

Reference is now made to FIG. 1 of the drawing wherein the relative azimuth bearing angle between points 1 and 2, which are typically separated from each other by a distance on the order of one mile and are not in direct line of sight with each other due to terrestrial obstacles, is determined by positioning laser, radiant energy source 11, at point 1 and optical receiver or detector 12 at point 2. Laser 11 projects upwardly in the vertical plane and pulsed, collimated, linearly polarized, monochromatic, coherent light beam, preferably at a wavelength outside of the visible spectrum, e.g., 6943 Angstroms, that is easily distinguished during daylight conditions. The beam derived from laser source 11 has sufficient intensity and collimation to be detected at point 2 with optical receiver 12, even though the laser source and receiver may be separated by distances more than one mile. Receiver 12 is rotatable about a horizontal axis and swings in the vertical plane, because terrestrial obstructions between points 1 and 2 may prevent direct line of sight between the two points, whereby the optical axis can be directed to a point on the beam derived by laser 11 considerably above the elevation of the laser source. Receiver 12 is rotatable about a vertical axis in the horizontal plane, to enable its optical axis to intersect the laser beam, whereby the azimuth bearing angle between points 1 and 2 can be ascertained.

Broadly, receiver 12 includes a detector for the optical energy derived by laser source 11 and an indicator to enable an operator of the receiver to determine if the receiver optical or boresight axis intersects the beam or on which side of the beam the receiver optical axis is located. The receiver has a relatively narrow field of view, typically one degree for a distance of one nautical mile, to provide appropriate magnification and prevent detection of spurious signals.

Laser source 11 is preferably a relatively high power, pulsed ruby laser having Q-switch type operation. Laser 11 is positioned so that its optical axis and, therefore, beam path are precisely aligned to the local vertical. To this end, a tripod on which the laser is fixedly mounted preferably includes a conventional leveling device, such as spirit levels. Once laser source 11 is positioned so that its optical axis is precisely aligned in the vertical plane, it is rotated so that the beam energy polarization plane, which is at right angles to the beam axis, is also approximately at right angles to the optical axis of receiver 12. The polarization plane of the beam derived by laser source 11 is approximately at right angles to the optical axis of receiver 12 to enable the receiver response to be maximized. To enable the polarization plane of the beam derived by laser source 11 to be approximately at right angles to the optical axis of the receiver 12, the platform on which laser source 12 is fixedly mounted includes a horizontally directed arrow extending in a direction at right angles to the polarization plane of the beam. The supporting platform is positioned so that the arrow is approximately aligned with the optical axis of receiver 12.

With laser source 11 positioned, a very low bandwidth communications link is established between receiver 12 and laser source 11. After the optical axis of receiver 12 has been approximately aligned with the expected trajectory of the beam of laser source 11, a pulse is transmitted via the communications link to the laser. The laser is energized in response to the pulse to produce a pulsed beam of optical energy. In response to the pulsed beam of optical energy, an indication is derived by receiver 12 of the relative position of the beam and the receiver optical axis. The receiver is then manually rotated about its vertical axis in a direction whereby its optical axis has a tendency to be aligned with the trajectory of the laser beam. Laser source 11 is then again pulsed by transmitting a pulse through the communication link and the relative position of the beam trajectory and optical axis is again ascertained. The receiver is again rotated about its vertical axis in a manner whereby its optical axis has a tendency to intersect with the trajectory of the laser beam. Operations are carried out in this manner until the receiver derives an indication that its optical axis intersects the trajectory of the laser beam.

Figure 2:
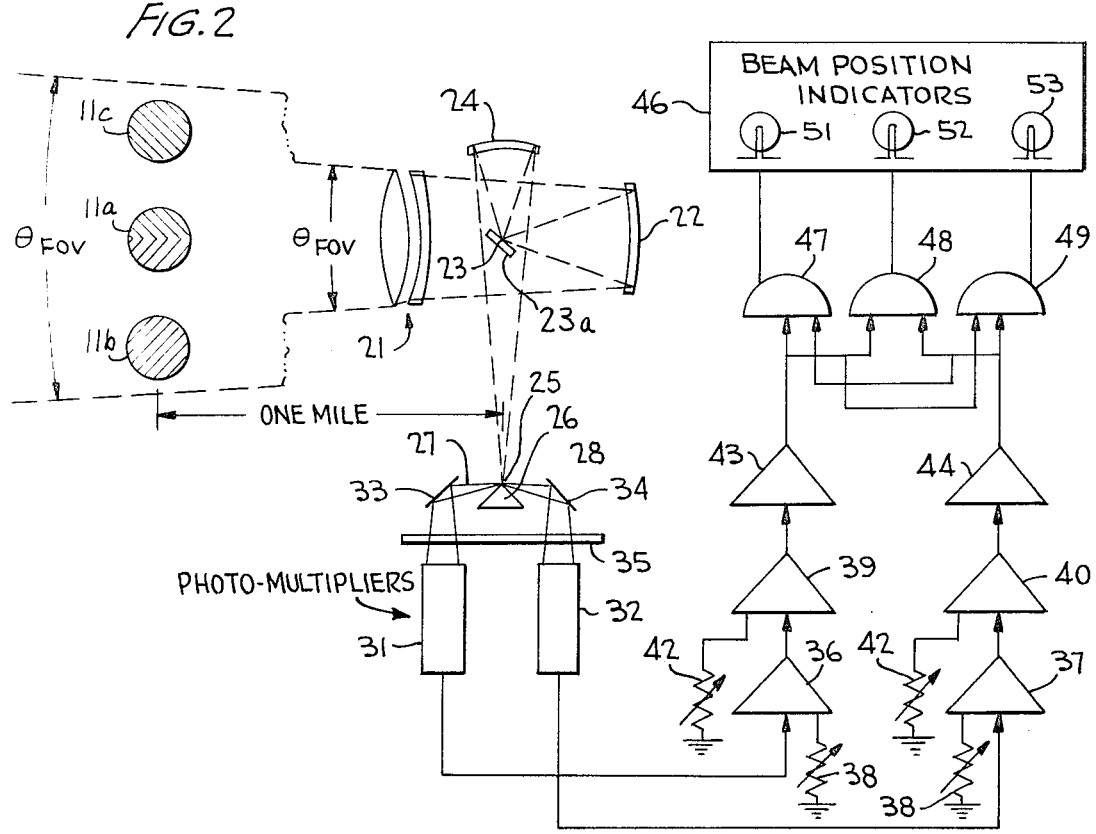
FIG. 2 is a schematic diagram illustrating optical and electronic elements employed in the receiver of the system of FIG. 1.

Reference is now made to FIG. 2 of the drawing wherein there is illustrated, in schematic optical and electronic form, apparatus employed in receiver 12. Scattered energy from the collimated beam derived from laser 11, when in the relatively narrow field of view of receiver 12, is focused by condensing lens 21 and concave mirror 22 on point 23 that lies on the receiver optical axis. The field of view of receiver 12 is designated by the angle $\theta$FOV. In one typical system the laser beam subtends an arc of one minute at the receiver. Representative cross-sections of the beam projected from laser source 11, as it may fall on-axis, or to the left or right of axis, within the field of view of receiver 12, is illustrated at 11a, 11b, and 11c, respectively. Energy focused on point 23 is reflected along a line at right angles to the common axes of lens 21 and reflector 22 by concave reflector 24 so that it focuses on point 25. Point 25 is thereby on the optical axis of the receiver, in the focal plane of reflector 24. Coincident with point 25 is the apex of roof prism 26 which forms a beam splitter. In response to the receiver optical axis intersecting the beam derived from laser source 11, optical energy is divided approximately equally into a pair of ray paths 27 and 28 extending approximately at right angles to a line through points 23 and 25.

In response to the laser beam being on the left side of the optical axis of receiver 12, optical energy reflected from mirror 24 is directed virtually exclusively to the left face of roof prism 26, whereby ray path 27 is established to the exclusion of ray path 28. In an opposite manner, ray path 28 is established in response to the laser beam lying on the right side of the receiver optical axis.

To determine if ray paths 27 and 28 are both established or if one of the ray paths is established to the exclusion of the other, photodetectors and electronic circuitry are provided. The photodetectors comprise photomultiplier tubes 31 and 32, respectively responsive to energy in ray paths 27 and 28, as coupled through planar mirrors 33 and 34 and optical filter 35, which passes optical energy in the wavelength of laser 11 but blocks energy in the visible spectrum. Output signals of photomultiplier tubes 31 and 32 are fed to amplifiers 36 and 37, having gains that can be set by variable resistors 38. The gains of amplifiers 36 and 37 are set so that the output signal of each is the same in response to the incident optical energy on photomultipliers 31 and 32 being identical. The output signals of amplifiers 36 and 37 are fed to Schmitt triggers 39 and 40, having variable threshold levels established by variable resistors 42. The gain factors of amplifiers 36 and 37, threshold levels of Schmitt triggers 39 and 40 and sensitivity of photomultiplier tubes 31 and 32 are such that background noise pulses which might be induced in photomultiplier tubes 31 and 32 do not exceed the threshold settings of the Schmitt trigger circuits but the pulsed energy from laser 11 does exceed the threshold settings. In addition, the variable gain settings of amplifiers 36 and 37 provide for control of the bandwidth of the receiver since the gain of any amplifier times its bandwidth is a constant. By controlling the bandwidth of the receiver so that it extends from approximately d.c. to a predetermined frequency capable of passing a majority of the frequency components of the pulsed radiation beam, higher frequency noise pulses due to extraneous sources are eliminated, to increase signal to noise ratio.

The output signals of Schmitt triggers 39 and 40, pulses having a fast rise time and constant amplitude as long as the variable threshold levels of the Schmitt triggers are exceeded, are fed to one-shot circuits 43 and 44. In response to each pulse derived by Schmitt triggers 39 and 40, one-shot circuits 43 and 44 generate a pulse of predetermined amplitude and duration. The pulses of predetermined amplitude and duration derived by one-shot circuits 43 and 44 are fed to a logic network 45 which drives indicator 46 that signals whether the laser beam intersects the receiver optical axis or on which side of the optical axis the laser beam lies.

Logic network 45 includes three gates 47, 48 and 49, all of which are responsive to binary signals derived by one-shot circuits 43 and 44. In response to energy subsisting in ray paths 27 and 28 simultaneously, as a result of the optical axis of receiver 12 intersecting the beam of laser 11, each of one-shot circuits 43 and 44 derives a binary one level; in response to only ray path 27 having optical energy from the laser beam therein, one-shot circuit 43 derives a binary one level to the exclusion of one-shot circuit 44; and one-shot circuit 44 derives a binary one level to the exclusion of one-shot circuit 43 in response energy from laser 11 subsisting only in ray path 28. In response to a binary signal being derived by both of one-shot circuits 43 and 44, logic gate 48, an AND gate, derives a binary one signal. Logic circuit 47 includes a network for forming the AND function between the output of one-shot circuit 43 and the complement of the out-put of one-shot circuit 44, while logic circuit 49 includes a network for forming the AND function between the output of one-shot circuit 44 and the complement of the output of one-shot circuit 43. Thereby, in response to both of one-shot circuits 43 and 44 deriving simultaneously a binary one signal, as occurs in response to the receiver optical axis intersecting the laser beam, the output signals of logic circuits 47 and 49 are binary zero levels, and the output signal of circuit 48 is a binary one level. In response to the laser beam lying to the left of the receiver optical axis, whereby a binary one signal is derived from one-shot circuit 43 to the exclusion of one-shot circuit 44, logic circuit 47 derives a binary one output signal and logic circuits 48 and 49 derive binary one signals. In response to the laser beam being on the right side of the receiver optical axis, whereby one-shot circuit 44 derives a binary one output signal to the exclusion of one-shot circuit 43, a binary one signal is derived by logic gate 49 while binary zero signals are derived by logic circuits 47 and 48.

The binary one signals derived by logic circuits 47, 48 and 49 are respectively fed to indicator lamps 51, 52 and 53 which are activated to an energized condition as long as the binary one signals are applied thereto. An operator viewing indicator lamps 51 and 53 is able to determine on which side of the receiver optical axis the laser beam lies. He rotates receiver 12 until the receiver optical axis intersects the beam, as indicated by lamp 52 being energized. Once lamp 52 is energized, the operator can determine the azimuth bearing angle between receiver 12 and laser source 11 by reading a scale on a platform on which the receiver is fixedly mounted.

While there has been described and illustrated one specific embodiment of the invention, it will be clear that variations in the details of the embodiment specifically illustrated and described may be made without departing from the true spirit and scope of the invention as defined in the appended claims.

I claim:

1. A system for enabling the relative azimuth bearing between two spaced points to be ascertained comprising means at one of the points for transmitting a collimated beam of monochromatic optical energy upwardly in the vertical plane, means at the second point for detecting the beam, said detecting means including an optical axis adapted to be directed towards the beam, a beam splitter for the beam, said beam splitter having an apex located on the axis, whereby in response to the optical axis being directed to intercept the beam, energy from the beam is deflected by the splitter in two different ray paths and in response to the optical axis being directed to one side of the beam while the beam is in the field of view, energy from the splitter is deflected by the splitter in only one of the ray paths, and means responsive to the energy in the two ray paths for deriving a signal indicative of whether the optical axis is directed at the beam.

2. The system of claim 1 wherein the signal deriving means includes means responsive to an off axis beam for deriving a signal indicative of the side in the field of view in which the beam is located.

3. A system for enabling the relative azimuth bearing between two spaced points to be ascertained comprising means at one of the points for transmitting a collimated beam of monochromatic optical energy along a first optical axis, means at the second point for detecting the beam, said detecting means including narrow field of view optical means having a second optical axis adapted to be directed towards the beam, one of said optical axes being located in the vertical plane, said detecting means further including means responsive to the monochromatic optical energy to provide an electrical output, and means responsive to said electrical output for deriving a first indication of said first and second axes intersecting and for deriving a second indication of the side on which said first axis lies relative to the second axis.

4. The system of claim 3 wherein said means responsive to said electrical output comprises means for deriving first and second pulses of predetermined amplitude in response to the energy level of the first and second ray paths respectively exceeding a predetermined amplitude, first logic circuit means responsive to the first and second pulses occurring simultaneously for deriving the first indication and second logic circuit means responsive to only one of the pulses for deriving the second indication.

5. A system for measuring the relative azimuth bearing between first and second spaced terrestrial points comprising transmitting means positioned at one of said points for projecting a beam of monochromatic radiant energy upwardly in a vertical plane, and receiving means positioned at the other of said points rotatable about a horizontal axis in the vertical plane, said receiving means including narrow field of view optical means having an optical axis for intersecting said beam, and detecting means responsive to monochromatic radiant energy to provide signals indicating the intersection of said optical axis with said beam.

6. A system of claim 5 wherein said beam of radiant energy has a wavelength outside the visible spectrum.

7. The system of claim 5 wherein said beam of radiant energy has a wavelength above ultraviolet.

8. The system of claim 5 wherein said beam of radiant energy has a wavelength of 6943 Angstroms.

* * * * *